Oct. 14, 1969

W. S. HOSEK 3,472,284

HERMETIC SEAL

Filed Dec. 21, 1966

INVENTOR.
WILLIAM S. HOSEK
BY
Edwin D. Grant

Oct. 14, 1969  W. S. HOSEK  3,472,284
HERMETIC SEAL

Filed Dec. 21, 1966  2 Sheets-Sheet 2

INVENTOR.
WILLIAM S. HOSEK
BY Edwin D. Grant

United States Patent Office 3,472,284
Patented Oct. 14, 1969

3,472,284
HERMETIC SEAL
William S. Hosek, Mount Tabor, N.J., assignor to Thiokol Chemical Corporation, Bristol, Pa., a corporation of Delaware
Filed Dec. 21, 1966, Ser. No. 603,641
Int. Cl. F16k 17/16, 17/40
U.S. Cl. 138—89    2 Claims This invention relates to a hermetic seal and more particularly to a seal assembly comprising a diaphragm and means for shearing said diaphragm at a predetermined pressure.

In many types of equipment there is a need for a seal which can be conveniently installed in a conduit and which will prevent fluid flow therethrough until a definite fluid pressure is reached. For example, the conduits connecting propellant storage tanks to the injectors of rocket motors often must be sealed until the storage tanks have been pressurized to a sufficiently high operating pressure, after which flow of propellant through said conduits must be permitted.

It is accordingly an object of this invention to provide an uncomplicated, effective means for sealing a conduit or an aperture until a certain fluid pressure is attained therein.

Another object of the invention is to provide a seal assembly that can be opened either by fluid pressure or by mechanical actuation.

Still another object of the invention is to provide a hermetic seal that can readily be designed to open when fluid pressure thereon has reached any selected level.

An additional object of the invention is to provide a diaphragm-type seal which, when opened by fluid pressure, does not disintegrate into fragments that may adversely affect the operation of apparatus with which the seal is utilized.

A clear and exact understanding of the invention will be obtained by reading the following description of a preferred embodiment thereof, reference being taken to the accompanying drawings wherein.

Throughout the specification and the drawings, like numbers refer to like parts.

Figure 1:
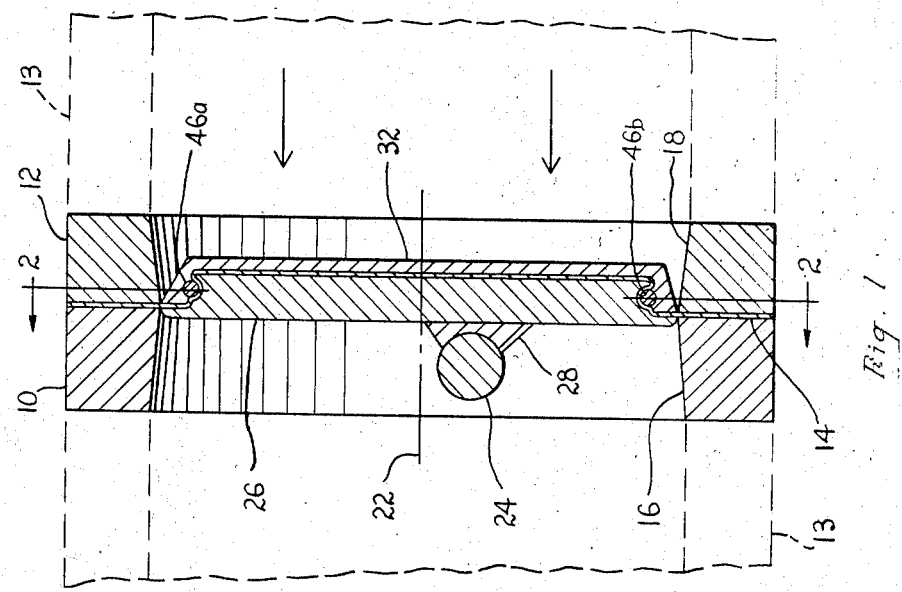
FIGURE 1 is a sectional view taken along the longitudinal axis of a preferred embodiment of the invention.

As illustrated in FIGURE 1, a seal assembly in accordance with the invention comprises a first apertured member 10 and a second apertured member 12 that abut opposite sides of a continuous diaphragm 14. Thus diaphragm 14 is fixedly clamped between members 10, 12. In the preferred embodiment of the invention, members 10, 12 are rings each formed with an aperture 16, 18 that becomes smaller toward diaphragm 14, the adjacent edges of the apertures being aligned. However, it is to be understood that members 10, 12 can be any abutting components in which there are coaxial apertures, such as, for example, parts of an engine block. In FIGURE 1 broken lines designated by the number 13 represent conduits that may be connected to members 10, 12 by means of welding.

Figure 2:
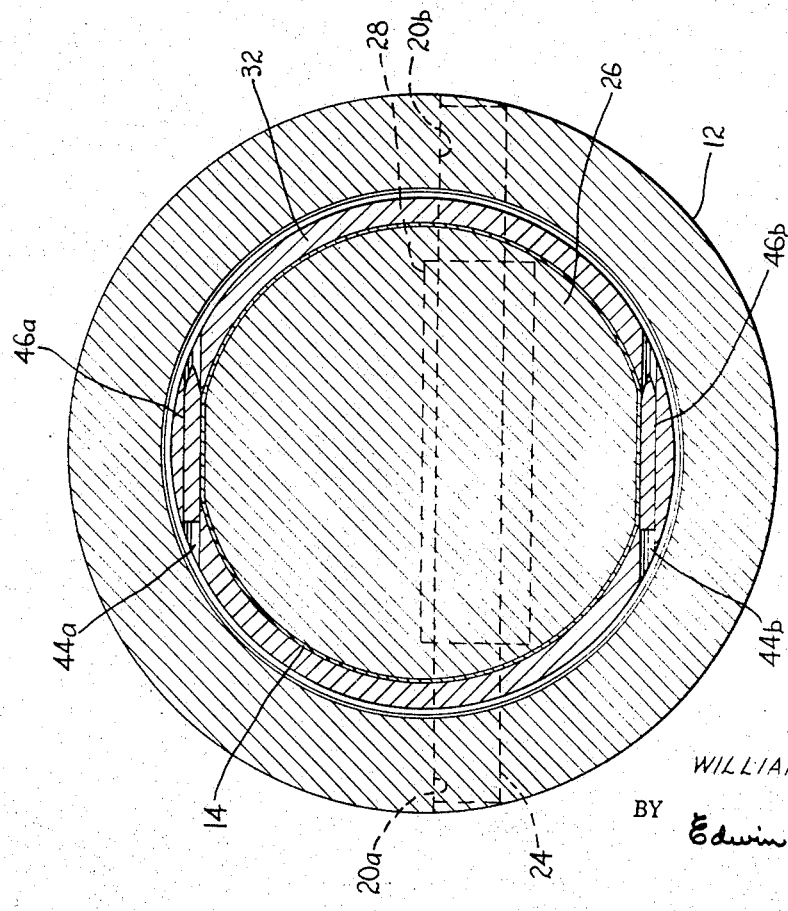
FIGURE 2 is a cross-sectional view of the same embodiment, taken along the plane represented by line 2—2 in FIGURE 1 and in the direction indicated by arrows.
Figure 3:
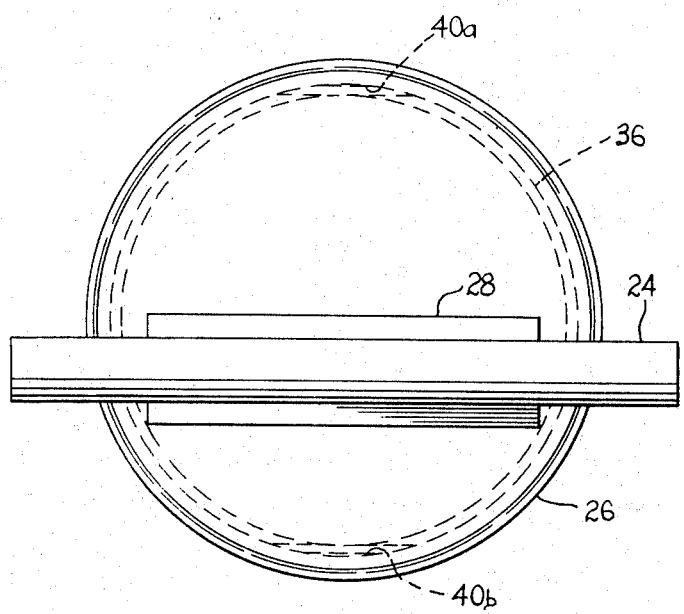
FIGURES 3, 4 and 5 are detail views of components of the same embodiment.

Two coaxial holes 20a, 20b (illustrated by broken lines in FIGURE 2) extend through first member 10, the common axis of these holes being perpendicular to, and spaced from, the longitudinal axis 22 of said first member. The ends of a shaft 24 are journaled in holes 20a, 20b, and a first disk 26 is fixedly attached to this shaft by means of a support member 28. First disk 26 abuts one side of diaphragm 14 and is initially disposed transversely across the aperture 16 in first member 10 with its peripheral edge 30 (see FIGURE 4) juxtaposed with the inner (i.e., closest to diaphragm 14) edge of said aperture 16. A second disk 32 abuts the other side of diaphragm 14 and is initially disposed transversely across the aperture 18 in second member 12 with its peripheral edge 34 juxtaposed with the inner edge of said aperture 18. As can best be seen in FIGURE 4, the side of first disk 26 adjacent second disk 32 is formed with a boss 36 that defines a circumferential surface 38 concentric with the edge 30 of said first disk. For a reason that will appear hereinafter, two hemicyclindrical grooves 40a, 40b are formed in surface 32 at diametrically opposed points thereon.

Figures 4, 5:
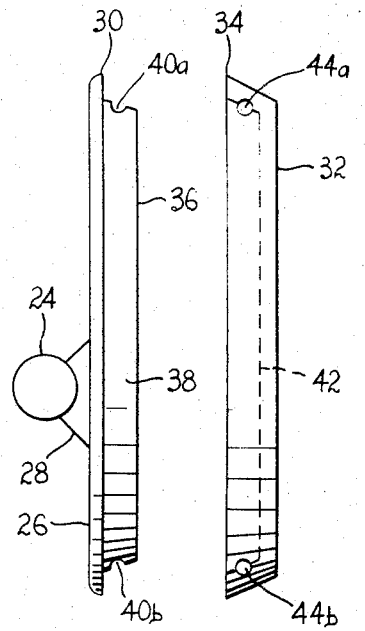

It can be seen in FIGURE 5 that second disk 32 is formed with a recess 42 (illustrated by a broken line in the drawing) the contours of which conform with those of boss 36. Thus when boss 36 is positioned within recess 42 as illustrated in FIGURE 1, a portion of diaphragm 14 is held against the surfaces of said boss by the surfaces of said recess. Furthermore, second disk 32 is provided with a pair of holes 44a, 44b that extend through the portion of said second disk circumscribing the recess 42 therein, each of these holes being aligned (see FIGURE 1) with a respective one of the grooves 40a, 40b on boss 36.

Second disk 32 is fixedly secured to first disk 26 by means of a pair of pins 46a, 46b each of which is force fitted within a respective one of the holes 44a, 44b in said second disk and disposed within a respective one of the grooves 40a, 40b on boss 36 of said first disk. This arrangement for locking the disks together has the advantage of maintaining a hermetic seal between the two apertures 16, 18 in members 10, 12 respectively. However, in other embodiments of the invention, other suitable means, such as a snap ring, may be employed to fasten the two disks fixedly together.

It will be recognized that the components of the aforedescribed embodiment of the invention can be made of many different, well-known materials. For example, diaphragm 14 can be formed of metal or a suitable elastomeric material, depending upon the use to which the seal assembly is applied.

Figure 6:
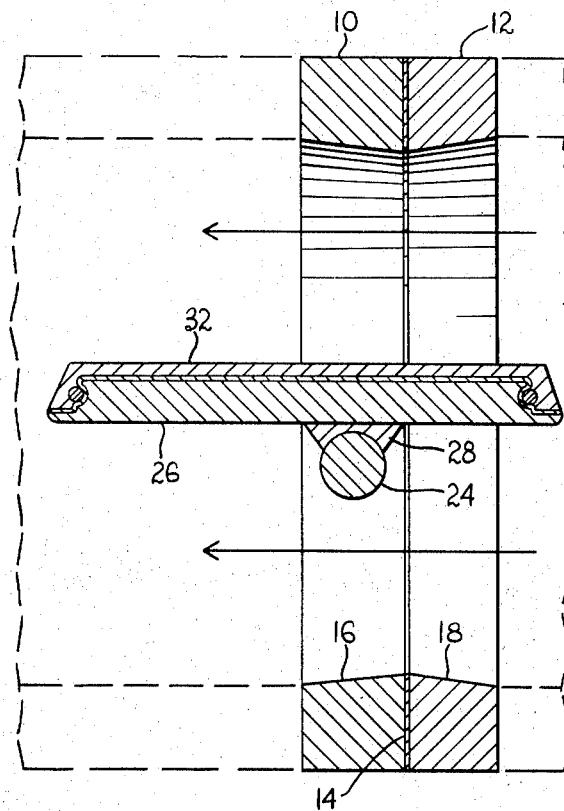
FIGURE 6 is a sectional view taken along the longitudinal axis of the same embodiment, illustrating the seal assembly after the diaphragm thereof has been sheared.

The large arrows in FIGURE 1 represent fluid pressure against second disk 32, which pressure is thus also applied to diaphragm 14. Since shaft 24 is offset relative to the common longitudinal axis of apertures 16, 18, disks 26, 32 are subjected to a moment that tends to rotate them in a counterclockwise direction, as these components are positioned in FIGURE 1. This moment is resisted, of course, by diaghragm 14. When the fluid pressure within aperture 18 reaches a sufficiently high value, the peripheral edges 30, 34 of first disk 26 and second disk 32 respectively will shear diaphragm 14, and said disks will rotate to the position thereof that is illustrated in FIGURE 6, namely, a position wherein the disks are disposed longitudinally of apertures 16, 18 so that the latter are placed in communication. The fluid pressure required to shear diaphragm 14 obviously depends upon such factors as the thickness of the diaphragm and the material of which it is made.

It is an important advantage of the invention that the thickness of diaphragm 14 can conveniently be varied to control the fluid pressure that is required to open the seal between apertures 16, 18. Moreover, the construction of the preferred embodiment of the invention is such that this shearing pressure can be predetermined with high accuracy and reproducibility. An additional advantage of the disclosed seal assembly is that shaft 24 thereof can readily be turned by mechanical or other means to bring apertures 16, 18 into communication at any desired time. Also it will be evident that since disks 26, 32 abut both sides of diaphragm 14, the latter cannot disintegrate into fragments which could interfere with the operation of a device, such as a fuel injector, that communicates with aperture 16.

Various modifications of the described and illustrated seal assembly will be obvious in view of the above specification.

What is claimed is:

1. A sealing assembly for closing a conduit comprising:
   a frangible imperforate diaphragm;
   a first apertured member abutting one side of said diaphragm;
   a second apertured member abutting the other side of said diaphragm, the adjacent edges of the apertures in said first and second member being aligned;
   a first disk extending transversely across the aperture in said first member and abutting one side of said diaphragm;
   a second disk extending transversely across the aperture in said second member and abutting the other side of said diaphragm;
   fastening means cooperating through said diaphragm for locking said first and second disks fixedly together; and
   means for pivotally mounting said first disk to said first member so that it can be pivoted about an axis disposed substantially perpendicular to the longitudinal axis of the aperture therein, whereby said diaphragm is sheared by the edges of said first and second disks when the latter are pivoted relative to said first and second members.

2. A sealing assembly as defined in claim 1 wherein:
   the side of said first disk adjacent said second disk is formed with a boss that defines a circumferential surface concentric with the edge of said first disk, a pair of hemicylindrical grooves being formed in said circumferential surface at diametrically opposed points thereon;
   said second disk is formed with a recess conforming with said boss, a portion of said diaphragm being held against the surfaces of said boss by the surfaces of said recess, a pair of holes extending through the portion of said second disk circumscribing said recess therein, each of said holes being aligned with a respective one of said grooves on said boss; and
   said fastening means comprises a pair of pins each forced fitted within a respective one of said holes, whereby diametrically opposed portions of said diaphragm aligned with said holes are fixed relative to said first and second disks and whereby said second disk is fixedly secured to said first disk.

References Cited

UNITED STATES PATENTS

| | | | |
|---|---|---|---|
| 3,038,485 | 6/1962 | Hosek | 137—68 |
| 3,039,482 | 6/1962 | Goldberg | 137—68 |
| 3,065,950 | 11/1962 | Goldberg | 137—68 X |
| 3,074,421 | 1/1963 | Borcherdt | 137—68 |

HERBERT F. ROSS, Primary Examiner

U.S. Cl. X.R.

137—68; 220—89